United States Patent Office 3,660,315
Patented May 2, 1972

3,660,315
PROCESS FOR PREPARING FLUORINE-CONTAINING POLYMERS
James T. Hill, Wilmington, Del., and Michael E. Garabedian, Ringwood, N.J., assignors to E. I. du Pont de Nemours and Company, Wilmington, Del.
No Drawing. Filed Sept. 22, 1970, Ser. No. 74,527
Int. Cl. C08g 23/14, 23/20
U.S. Cl. 260—2 A                          10 Claims

ABSTRACT OF THE DISCLOSURE

A process having beneficial utility in the manufacture of fluorine-containing polymers from HFPO (hexafluoropropylene oxide), especially useful for applications requiring difunctional polymer products that are substantially free of monofunctional polymer. The polymerization process employs a mixture of HFPO and a catalyst; the catalyst, which preferably is substantially free of cesium fluoride, is made up of a solution in an ethylene glycol ether of a particular organic compound containing both cesium and fluorine. The polymerization reaction zone is preferably at about $-30$ to $-60°$ C., and it preferably contains hexafluoropropylene or the like as a solvent for the polymer.

BACKGROUND OF THE INVENTION

This invention relates to a process for preparing fluorine-containing polymers.

It is known that useful fluorine-containing polymers can be prepared by polymerizing HFPO (hexafluoropropylene oxide) in the presence of a suitable catalyst or initiator (substance which enables the polymerization reaction to take place within a reasonable period of time). But the known processes for preparing polymers from HFPO have not been entirely satisfactory for many applications. There is a need for a process which enables one to polymerize HFPO and obtain a difunctional polymer which is substantially free of monofunctional polymer upon completion of the polymerization reaction, thereby requiring no costly and hazardous distillation (which can damage the product) or other separation procedure to remove monofunctional polymer and to obtain a substantially pure difunctional polymer product.

SUMMARY OF THE INVENTION

Expressed broadly, the present invention provides a process for preparing a difunctional fluorine-containing polymer from the monomer hexafluoropropylene oxide and a fluorine-containing catalyst, which consists essentially of (A) Providing as a preformed catalyst composition a solution of a cesium and fluorine-containing organic compound in a solvent comprised of an ethylene glycol ether, said organic compound having the formula

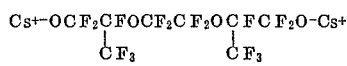

(B) Mixing hexafluoropropylene oxide with the resulting catalyst composition in a polymerization reaction zone at a temperature above the freezing point of said solvent, and (C) Continuing to mix the contents of the reaction zone at said temperature until said difunctional polymer is formed and there is little or no monofunctional polymer in the reaction zone.

DESCRIPTION OF PREFERRED EMBODIMENTS

The process is preferably carried out so that the catalyst composition obtained in step A is placed in the reaction zone and then the hexafluoropropylene oxide is gradually introduced into the reaction zone at a rate such that the ratio of parts by weight of hexafluoropropylene oxide added per hour to the combined weight of said organic compound and said ether solvent is about 10:90 to 90:10, and the polymer obtained in the process is heated until its —CF$_2$O$^-$Cs$^+$ end groups are converted to —COF groups, the resulting polymer having the formula

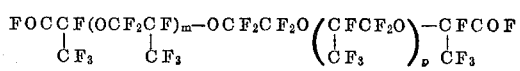

wherein $m$ and $p$ are numbers, the sum of which is about 2–50. The conversion of the end groups from $$-CF_2O^-Cs^+$$

to —COF is preferably done by heating the polymer at about 105–155° C. Temperatures much below 105° C. tend to give incomplete or unduly slow conversion. Isolation of the polymer from the other components at the end of step C can be done by conventional methods as illustrated below in Example 1.

Useful derivatives of the polymer obtained by the present process can be obtained by converting the end groups of the polymer to another group. For example, the end groups can be converted to: (1) acid (carboxyl) groups by reacting the —COF terminated polymer with water, e.g. by forming a solution of the polymer of workable viscosity in a suitable solvent such as trichlorotrifluoroethane, and mixing the solution with water until the conversion is complete; (2) acid salt groups by mixing the polymer solution of (1) with an aqueous dispersion of a metal hydroxide or metal oxide, the metallic ion being for example sodium, potassium, mercury or lead; (3) amide groups by reacting the polymer (or the ester derivative of 6) with ammonia or an amine; (4) nitrile groups by dehydrating the amide-terminated polymer of (3), e.g. in the presence of phosphorous pentoxide at about 200° C.; (5) polyamide groups by reacting the polymer with a polyamine (e.g. ethylene diamine or other amines having two or more amine groups reactive with the —COF groups); (6) ester groups by reacting the polymer with an alcohol, e.g. by mixing the solution of (1) with ethanol or other suitable monohydric alcohol in the presence of a hydrogen fluoride acceptor such as sodium fluoride; (7) polyester groups by reacting the polymer with a glycol or other alcohol having two or more —OH groups reactive with the —COF groups; (8) amidine groups by reacting the nitrile-terminated polymer of (4) with ammonia or an amine; (9) polyamidine groups by reacting the nitrile-terminated polymer of (4) with a polyamine as used in (5); (10) hydrazide groups by reacting the polymer with hydrazine; or (11) triazine groups (thereby forming an elastomer) by heating the amidine-terminated polymer of (8) or by heating the nitrile-terminated polymer of (4) in the presence of a suitable catalyst (e.g. AgO); this can be done by heating the isolated converted polymer of (8) or (4) at about 200° C. until conversion to the triazine elastomer is complete.

In preferred embodiments of the process, the catalyst composition is prepared in such a manner that it is substantially free of cesium fluoride (completely or almost completely free of cesium fluoride). In these embodiments, the catalyst solution provided in step A usually contains less than 0.1%, preferably less than 0.01%, of cesium fluoride based on the combined weight of the catalyst compound and the ether solvent present in the catalyst composition. As illustrated below in Example 1, after forming the catalyst compound by reacting cesium fluoride with a solution of a compound capable of reacting with it to form the catalyst compound, substantially all (all or nearly all) of the cesium fluoride remaining in the composition is removed by means of a suitable separation apparatus (e.g. a centrifuge). After removal of substantially all of the cesium fluoride from the catalyst composition, one can accurately determine the number of moles of catalyst present per gram of catalyst solution. This permits calculation of the amount of HFPO needed in step B to obtain a product having the desired specific molecular weight. Also, the removal of excess cesium fluoride removes the danger of obtaining monofunctional polymer in the product as a result of a reaction between the cesium fluoride and HFPO or hexafluoropropylene; for example, this can occur when the reaction temperature during step B or C is within the range of about —29 to +30° C.

In carrying out the process of this invention, the temperature in the reaction zone during steps B and C is maintained above the freezing point of the solvent of step A; the temperature is usually at about +30 to —100° C., preferably below the boiling point of the monomer, and still more preferably within the range of about —30 to —60° C.

An especially preferred ether to employ in step A as a solvent for the organic catalyst compound is tetraethylene glycol dimethyl ether, which is also known as tetraglyme. Other useful ethylene glycol ethers are illustrated by diethylene glycol dimethyl ether (diglyme) and triethylene glycol dimethyl ether (triglyme). It is generally advisable to use an anhydrous ether.

Preferably there is mixed with the solution provided in step A at least one other organic liquid in an amount such that the weight ratio of said ether to said other liquid is about 1:99 to 99:1, said other liquid being a solvent for about 50–100% by weight of the polymer resulting from the process at the temperature used in forming the polymer and undergoing no harmful reaction with the other ingredients present in the reaction zone. The addition of said other liquid facilitates stirring and heat transfer, especially when operating at —30° C. or lower, and is beneficial in applications where maximum molecular weight of the product is desired.

Among the best liquids to employ as said other organic liquid are hexafluoropropylene and dimers and trimers of hexafluoropropylene. Also useful are such liquids as chlorotrifluoroethylene and dichlorodifluoromethane. Mixtures of two or more of the liquids mentioned can also be used.

It is often preferred to carry out the process so that the weight ratio of said ether to said other organic liquid is about 10:90 to 75:25 just prior to step B, and an additional amount of said other organic liquid is added to the reaction zone during the formation of the polymer in an amount such that the total amount of said other organic liquid present in the reaction zone is about 10–80% based on the total weight of composition in the reaction zone at the end of step C.

If the polymer obtained under a given set of process conditions with a given amount of catalyst does not have a molecular weight as large as desired for a particular application, it is often possible to increase the molecular weight by increasing the total amount of monomer added to the reaction zone; for example one can add the monomer at a faster rate for a given period of time.

The process of this invention is very useful for manufacturing difunctional fluorine-containing polymers which are substantially free of any monofunctional polymer component on completion of the polymerization reaction. Thus, the invention makes it possible to obtain substantially pure difunctional polymer directly from the polymerization reaction zone. Readily obtainable by this process are polymers having an $m+p$ value of up to about 50 and a monofunctional polymer content of about 0–0.5% by weight of polymer product. The drawbacks associated with prior art methods requiring subsequent separation procedures (e.g. distillation) to obtain substantially pure (monofunctional polymer free) difunctional polymer can therefore be eliminated by using the present process. Said drawbacks include not only the time and expense of providing and using the separation apparatus, but also the danger of rendering the product useless for the intended applications by converting the polymer end groups form —COF to —F or other groups.

The present process is also useful for preparing difunctional fluorine-containing polymer products which are relatively low in monofunctional polymer content (e.g. not over 5% by weight of polymer obtained) even though not substantially free (completely or almost completely free) of monofunctional polymer on completion of the polymer-forming reaction. In some applications, such as in the manufacture of certain useful derivatives of the polymer, the product whose difunctional polymer content is about 95.0–99.5% by weight can also be used without further processing or purification.

Polymers prepared by the present process are useful for the manufacture of elastomers, plastics, relatively inert solvents, heat-resistant fluids for lubricating and heat-transfer applications, and the like.

The examples which follow are given for the purpose of illustrating the invention. All quantities shown are on a weight basis unless otherwise indicated.

Example 1

A difunctional fluorine-containing polymer that is free of monofunctional polymer on completion of the polymerization process is prepared by (1) placing 68.5 parts of anhydrous cesium fluoride and 100 parts of anhydrous tetraglyme in a flask while the flask is kept dry in a dry box, the flask being equipped with a stirrer, gas inlet, condenser, thermometer and cooling jacket; (2) purging the flask with dry nitrogen; (3) gradually adding to the flask with a stirring over a period of one hour 66 parts of oxalyl fluoride while keeping the contents of the flask at —33° C.; (4) gradually allowing the temperature of the contents of the flask to rise to about 21° C.; (5) transferring the contents of the flask (initiator for catalyst preparation) to a shaker tube equipped with a cooling jacket while the tube is kept dry with dry nitrogen; (6) while keeping the interior of the tube at about —78° C., condensing into the tube 150 parts of oxalyl fluoride and 1,250 parts of HFPO; (7) after closing the tube with a pressure-tight cover, shaking its contents on a shaker apparatus while allowing the temperature of the contents to rise gradually to about 0° C.; (8) keeping the contents of the tube at about 0° C. for six hours while shaking, then at 20° C. for two hours, and then warming the contents to about 25° C., the tube now containing (besides impurities) the symmetrical diadduct of HFPO with oxalyl fluoride whose formula is

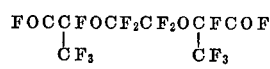

(9) placing two batches of the impure diadduct prepared as described in steps (1)–(8) in a flask equipped with thermometer, stirrer, and distillation means; (10) heating the flask and collecting the material boiling up to 104° C. at atmospheric pressure; (11) purifying the distillate (partly purified diadduct) by means of a distillation apparatus having a vacuum-jacketed column and removing the material boiling up to 95.5° C.; (12) further purifying the diadduct to close to 100% purity by redistilling the resulting residue by means of a distillation apparatus equipped with a 30-inch platinum spinning band column and collecting the material boiling in the range of 102.5–102.8° C.; (13) placing in a dry bottle 124.2 parts of the purified diadduct, 95 parts (10% excess) of anhydrous pulverized cesium fluoride, and 335.9 parts of anhydrous freshly distilled tetraglyme; (14) adding to the bottle 30 stainless steel balls having a diameter of ⅜ inch and tightly capping the bottle; (15) while keeping the contents of the bottle at about 10–15° C., shaking the bottle periodically until the mixture has a uniform appearance; (16) placing the bottle on a rotating apparatus and rotating it for 48 hours while the contents art at 25° C.; (17) transferring the resulting cloudy or milky appearing impure catalyst composition (in which about 10% of the cesium fluoride remains in unreacted form) from the bottle to centrifuge tubes and centrifuging it for 30 minutes at 25° C. and 2000 r.p.m. to remove the excess cesium fluoride; (18) pouring the purified catalyst, now a clear liquid containing about 0–0.01% of cesium fluoride, from the centrifuge tubes into a dry bottle to await use in step B of the process of this invention as described above, step A having provided a catalyst composition composed of a cesium fluoride-free solution in a suitable ether (tetraglyme) of an organic compound whose formula is shown above in step A of the process, the weight ratio of said compound to said ether being 38.8:61.2; (19) providing a polymerization reaction flask which has been thoroughly dried, equipped with a stirrer, gas inlet, thermometer, cooling jacket, and dry ice condenser, and flushed with dry nitrogen for 24 hours; (20) adding to the flask 520 parts of a catalyst composition (0.29 mole of catalyst compound) prepared as described in steps 1–18; (21) keeping the contents of the flask at −40° C. while stirring and adding 903 parts of pure, dry hexafluoropropylene, which is a solvent for the polymer to be formed; (22) gradually adding to the flask at the rate of 106 parts per hour with stirring 820 parts of HFPO while keeping the contents at about −32° C.; (23) continuing to stir the contents of the flask for one hour at about −33° C., the polymer composition in the flask (2,243 parts) now having a hexafluoropropylene content of about 40%, and the resulting difunctional polymer having —CF₂O−Cs⁺ (cesium alkoxide) end groups which can easily be converted to —COF (acid fluoride) groups, for example, by heating the composition; (24) allowing the temperature of the resulting polymer composition to rise to 25° C. while keeping the flask under a vacuum and allowing the hexafluoropropylene to evaporate from the flask; (25) heating the polymer composition briefly to 150° C. to convert any remaining —CF₂O−Cs⁺ end groups on the polymer to —COF groups and to complete the separation of the composition into a tetraglyme top layer, a polymer middle layer, and cesium fluoride bottom layer; and (26) removing the tetraglyme layer by means of a separatory funnel and removing the cesium fluoride by means of a centrifuge or a filtration apparatus, leaving a pure polymer product.

The product obtained in step 26 is a difunctional fluorine-containing polymer which is completely free of any monofunctional polymer component, and which has the formula shown above in the first paragraph under "Description of Preferred Embodiments," $m+p$ being numbers whose sum is about 16.2. The polymer has an average molecular weight of 3,140.

Example 2

In another useful embodiment of the novel process, Example 1 is repeated except only a portion of the hexafluoropropylene (120 parts) is added in step 21 (prior to adding the HFPO), the remaining 783 parts being added gradually during the step 22 addition of HFPO and resulting polymer formation. The product obtained is substantially the same as in Example 1.

A chemist skilled in the art, after reading the present disclosure, will be able to convert the end groups of the polymer obtained in Examples 1 and 2 to other groups to form useful derivatives of the polymer as described above in the second paragraph under "Description of Preferred Embodiments."

Example 3

When Example 1 is repeated except step 17 (the removal of cesium fluoride from the catalyst) is omitted and, therefore, the catalyst is not substantially free of cesium fluoride, the product obtained in step 26 is substantially the same as in Example 1. However, the Example 3 process lacks these advantages of the Example 1 process: (a) the ease with which one skilled in the art can determine the exact amount of HFPO needed (based on the exact number of moles of catalyst present per gram of catalyst solution) to obtain a polymer of a particular molecular weight; and (b) the removal of any danger of a reaction between cesium fluoride and HFPO or hexafluoropropylene to produce monofunctional polymer should the temperature happen to rise during polymer formation above the desired specified low temperature. The monofunctional polymer would be the HFPO homopolymer of the formula $$CF_3CF_2CF_2O(CFCF_2O)_n-C\underset{CF_3}{\overset{O}{\overset{\|}{F}}}CF$$

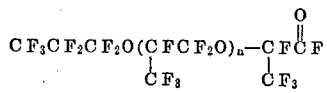

Example 4

A difunctional polymer product of greater molecular weight than obtained in Example 1 and containing no monofunctional polymer is prepared by repeating Example 1 except (a) the amount of catalyst added in step 20 is 0.17 mole of catalyst compound (322.7 grams of catalyst composition); (b) the amount of hexafluoropropylene added in step 21 is 815 grams; (c) the amount of HFPO added in step 22 is 917 grams, added at the rate of about 213 grams per hour for about 4.3 hours; and (d) the word "parts" is replaced by "grams" throughout the example.

The resulting polymer has an $m+p$ value of 31 and an average molecular weight of about 5600.

A substantially pure difunctional polymer having an $m+p$ value of about 50 and a molecular weight of 8,764 can be prepared by repeating Example 4 except for increasing the amount of HFPO to 1,411 grams.

We claim:
1. A process for preparing a fluorine-containing polymer that is difunctional with respect to cesium alkoxide or acid fluoride groups from the monomer hexafluoropropylene oxide and a fluorine-containing catalyst, which consists essentially of
  (A) providing as a preformed catalyst composition a solution of a cesium and fluorine-containing organic compound in a solvent comprised of an ethylene glycol ether, said organic compound having the formula

$$Cs^+-OCF_2CFOCF_2CF_2OCFCF_2O-Cs^+$$
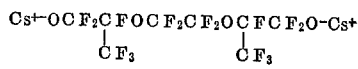

(B) mixing hexafluoropropylene oxide with the resulting catalyst composition in a polymerization reaction zone at a temperature above the freezing point of said solvent, and
  (C) continuing to mix the contents of the reaction zone at said temperature until said difunctional polymer is formed and there is little or no monofunctional polymer in the reaction zone.
2. A process according to claim 1 wherein the catalyst composition obtained in step A is placed in the reaction zone and then the hexafluoropropylene oxide is gradually introduced into the reaction zone at a rate such that the ratio of parts by weight of hexafluoropropylene oxide added per hour to the combined weight of said organic compound and said ether solvent is about 10:90 to 90:10, and the polymer obtained in the process is heated until its —CF$_2$O$^-$Cs$^+$ end groups are converted to —COF groups, the resulting polymer having the formula

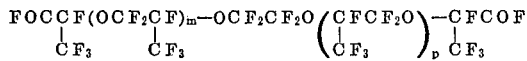

wherein $m$ and $p$ are numbers, the sum of which is about 2–50.

3. A process according to claim 2 wherein the polymer end groups are converted to —COF groups by heating the polymer at about 105–155° C.

4. A process according to claim 2 wherein said catalyst composition is prepared in such a manner that it is substantially free of cesium fluoride.

5. A process according to claim 2 wherein the temperature in the reaction zone during steps B and C is maintained at about +30 to —100° C.

6. A process according to claim 5 wherein said temperature is maintained at about —30 to —60° C.

7. A process according to claim 6 wherein said ether solvent is anhydrous tetraethylene glycol dimethyl ether.

8. A process according to claim 6 wherein there is mixed with the solution provided in step A at least one other organic liquid in an amount such that the weight ratio of said ether to said other liquid is about 1:99 to 99:1, said other liquid being a solvent for about 50–100% by weight of the polymer resulting from the process at the temperature used in forming the polymer and being inert to the other ingredients present in the reaction zone.

9. A process according to claim 8 wherein said other organic liquid is selected from the group: hexafluoropropylene and dimers and trimers of hexafluoropropylene.

10. A process according to claim 8 wherein the weight ratio of said ether to said other organic liquid is about 10:90 to 75:25 just prior to step B, and an additional amount of said other organic liquid is added to the reaction zone during the formation of the polymer in an amount such that the total amount of said other organic liquid present in the reaction zone is about 10–80% based on the total weight of composition in the reaction zone at the end of step C.

References Cited
UNITED STATES PATENTS

| | | | |
|---|---|---|---|
| 3,250,806 | 5/1966 | Warnell | 260—535 |
| 3,250,807 | 5/1966 | Fritz et al. | 260—535 |
| 3,250,808 | 5/1966 | Moore et al. | 260—535 |
| 3,274,239 | 9/1966 | Selman | 260—514 |
| 3,322,826 | 5/1967 | Moore | 260—544 |
| 3,419,610 | 12/1968 | Temple | 260—544 |

HAROLD D. ANDERSON, Primary Examiner

E. A. NIELSEN, Assistant Examiner

U.S. Cl. X.R.

260—33.8 EP, 75 H, 78 R, 78.4 N, 465.6, 484 P, 535 H, 535 P, 544 F, 561 H, 561 HL, 561 B